US010514930B2

(12) United States Patent
Xiao

(10) Patent No.: US 10,514,930 B2
(45) Date of Patent: Dec. 24, 2019

(54) SETTING A STARTUP PARAMETER AND CONTROLLING STARTUP OF A MAINBOARD

(71) Applicant: HANGZHOU QUEENHIVE INFORMATION TECHNOLOGIES CO., LTD., Hangzhou, Zhejiang (CN)

(72) Inventor: Ke Xiao, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 83 days.

(21) Appl. No.: 15/565,741

(22) PCT Filed: Apr. 29, 2016

(86) PCT No.: PCT/CN2016/080670
§ 371 (c)(1),
(2) Date: Oct. 11, 2017

(87) PCT Pub. No.: WO2016/173537
PCT Pub. Date: Nov. 3, 2016

(65) Prior Publication Data
US 2018/0074828 A1 Mar. 15, 2018

(30) Foreign Application Priority Data
Apr. 29, 2015 (CN) .......................... 2015 1 0218178

(51) Int. Cl.
G06F 9/44 (2018.01)
G06F 9/4401 (2018.01)
(Continued)

(52) U.S. Cl.
CPC ........ G06F 9/4401 (2013.01); G06F 9/44505 (2013.01); G06F 11/22 (2013.01); G06F 11/2284 (2013.01)

(58) Field of Classification Search
CPC .... G06F 9/44502; G06F 9/44508; G06F 1/24; G06F 9/44526; G06F 15/177;
(Continued)

(56) References Cited

U.S. PATENT DOCUMENTS 7,783,875 B2   8/2010   Oddiraju et al.
8,443,180 B2   5/2013   Lin et al.
(Continued)

FOREIGN PATENT DOCUMENTS

CN   101135974 A   3/2008
CN   101183972 A   5/2008
(Continued)

OTHER PUBLICATIONS

International Search Report and Written Opinion, International Application No. PCT/CN2016/080670, dated Aug. 10. 2016, pp. 1-7, SIPO.

Primary Examiner — Zahid Choudhury
(74) Attorney, Agent, or Firm — Park, Vaughan, Fleming & Dowler LLP

(57) ABSTRACT

In an example, a method for setting a startup parameter is provided. A management controller of a mainboard receives a startup parameter setting command, wherein the startup parameter setting command includes a value of a startup parameter to be set. The management controller stores the value of the startup parameter to be set in a nonvolatile storage medium that is directly accessed by the management controller according to the startup parameter setting command.

10 Claims, 9 Drawing Sheets

(51) Int. Cl.
*G06F 9/445* (2018.01)
*G06F 11/22* (2006.01)
(58) Field of Classification Search
CPC ............. G06F 9/44514; G06F 9/44523; G06F 11/1417; G06F 9/44505
See application file for complete search history.

(56) References Cited

U.S. PATENT DOCUMENTS

| | | | | |
|---|---|---|---|---|
| 2010/0023741 | A1* | 1/2010 | Wang | G06F 11/1004 713/2 |
| 2010/0205422 | A1* | 8/2010 | Shao | G06F 9/4403 713/2 |
| 2012/0258732 | A1 | 10/2012 | Jeong | |
| 2015/0154092 | A1* | 6/2015 | Chen | G06F 9/4401 713/2 |
| 2016/0055007 | A1* | 2/2016 | Toriyama | G06F 9/44505 713/2 |

FOREIGN PATENT DOCUMENTS

| | | |
|---|---|---|
| CN | 101369257 A | 2/2009 |
| CN | 103383663 A | 11/2013 |

* cited by examiner

US 10,514,930 B2

SETTING A STARTUP PARAMETER AND CONTROLLING STARTUP OF A MAINBOARD

BACKGROUND

BIOS (Basic Input Output System) are machine executable binary codes stored in a mainboard's ROM. The machine executable binary codes may include, for example, BIOS program, configuration information, Power-on Self-test, initialization procedure, interrupt services for Operating System and applications which are running, and so on. BIOS control operations of all hardware of a computer system, and provide underlying calls for high-level software.

In order to enable users to control mainboard startup and hardware operations according to their own requirements, BIOS provide a setup (startup setting) interface for users to set startup parameters. When the mainboard is booting, the users may press a key to enter the setup interface to modify the startup parameters in a predetermined time period. At this time, the startup process of the mainboard is interrupted. The mainboard is restarted when the users logged out the setup interface.

DETAILED DESCRIPTION OF THE EMBODIMENTS

Under the condition that a mainboard is running, if a user desires to modify a startup parameter, the mainboard will at least reboot twice. When the mainboard is rebooted in the first time, the user may press a predetermined key to enter the setup interface and modify the startup parameter in the setup interface according to his own requirements, and the modified value of the startup parameter will be stored through BIOS's storing function. After logging out the setup interface, the mainboard will be rebooted to make the modified startup parameter take effect. During the time period that the mainboard is rebooted twice and the time period that user is operating the setup interface, all functions of the mainboard cannot work.

During the startup process of the mainboard, a pause time will be needed for waiting for the user to select whether to press the predetermined key to enter the setup interface. The user may press the predetermined key for several times at the BIOS startup stage to not miss the pause time. Every time when the user presses the predetermined key, BIOS will respond to it and will call a corresponding interrupt program, which wastes a lot of CPU (Central Process Unit) overhead. Once the user missed the time period for entering the setup interface during the current startup process of the mainboard, the user needs to reboot the mainboard and waits for entering the setup interface, which is very inconvenient for the user.

In another example of the present disclosure, by operating a startup parameter setting control logic of the management controller on the mainboard, the startup parameter can be set simultaneously when the mainboard is running, thereby reducing the device offline time caused by modifying the startup parameter. Correspondingly, the startup control logic executed by the CPU of the mainboard may be combined with the startup parameter setting control logic executed by the management controller to complete the mainboard's startup.

Figure 1:
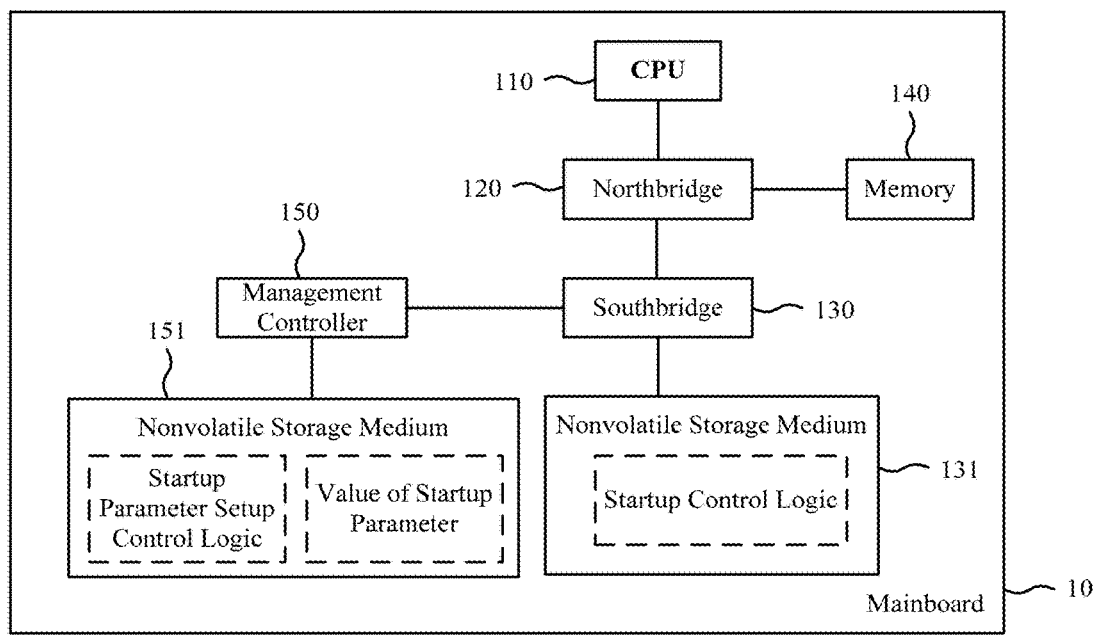
FIG. 1 schematically illustrates a hardware architecture diagram of a mainboard according to an example of the present disclosure.
Figure 2:
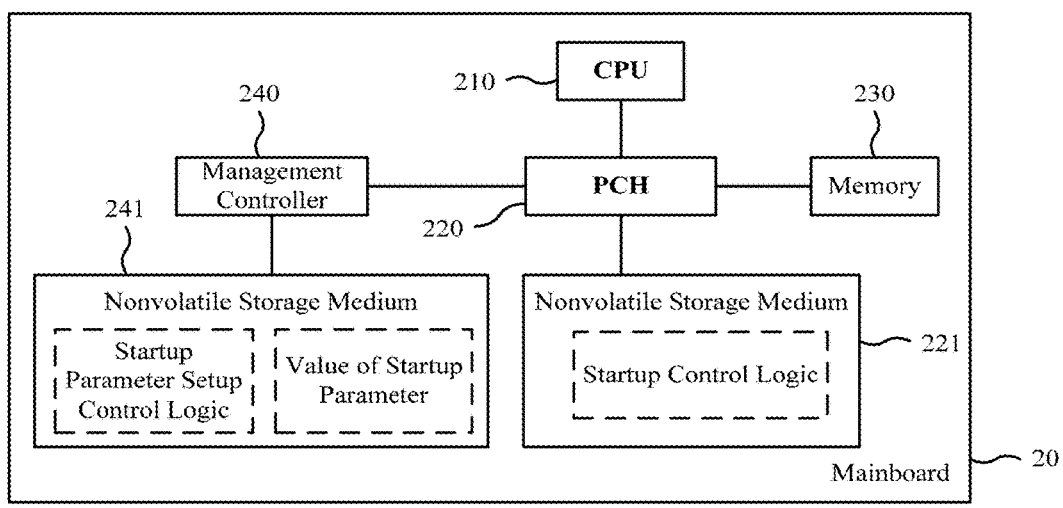
FIG. 2 schematically illustrates a hardware architecture diagram of a mainboard according to another example of the present disclosure.

A mainboard of the present disclosure may have a hardware architecture shown in FIG. 1 or FIG. 2. Referring to FIG. 1, the mainboard 10 illustrated in FIG. 1 includes a CPU 110, a Northbridge 120, a Southbridge 130, a Memory 140, a management controller 150, a nonvolatile storage medium 131, and a nonvolatile storage medium 151, wherein the CPU 110 may access the Memory 140 via the Northbridge 120, and the Southbridge 130 may connect to the CPU 110 via the Northbridge 120. The CPU 110 may directly access the nonvolatile storage medium 131, which is connected to the Southbridge 130, rather than accessing the nonvolatile storage medium 131 via other independently-operating processors. The machine executable instructions corresponding to the startup control logic are stored in the nonvolatile storage medium 131, and may be read out by the CPU 110 to the Memory 140 to be executed. The Southbridge 130 is connected to the management controller 150, and the management controller 150 is connected to the nonvolatile storage medium 151 that is directly accessed by the management controller 150. The machine executable instructions corresponding to the startup parameter setting control logic are stored in the nonvolatile storage medium 151, and may be read out by the management controller 150 to be executed.

Referring to FIG. 2, the mainboard 20 illustrated in FIG. 2 includes a CPU 210, a PCH (Platform Controller Hub) 220, a Memory 230, a management controller 240, a nonvolatile storage medium 221, and a nonvolatile storage medium 241, wherein the CPU 210 may access the Memory 230 via the PCH 220. The nonvolatile storage medium 221, which is directly accessed by the CPU 210, is connected to the PCH 220. The machine executable instructions corresponding to the startup control logic are stored in the nonvolatile storage medium 221, and may be read out by the CPU 210 to the Memory 230 to be executed. The PCH 220 is connected to the management controller 240, and the management controller 240 is connected to the nonvolatile storage medium 241 that is directly accessed by the management controller 240. The machine executable instructions corresponding to the startup parameter setting control logic are stored in the nonvolatile storage medium 241, and may be read out by the management controller 240 to be executed.

The management controller is a management unit of the mainboard, and may be used for monitoring and controlling the mainboard's temperature, power supply status, and so on. The management controller has its own processor, and may operate independent of the mainboard's CPU. In another example, the nonvolatile storage medium, which is directly accessed by the management controller, stores the machine executable instructions corresponding to the control logic of the management controller. For example, the management controller may include a BMC (Baseboard Management Controller) and an EC (Embedded Controller). In this example, the nonvolatile storage medium, which is directly accessed by the management controller, stores values of all startup parameters for setting of a user, and thus setting of these startup parameters can be completed by the management controller without being executed through the mainboard's CPU. The management controller can operate independently, so the startup parameters can be set when the mainboard is running, without waiting for completion of setting the startup parameter during the startup process of the mainboard.

It should be noted that, the machine executable instructions corresponding to the startup parameter setting control logic and the values of the startup parameters may be stored in the same storage medium (as is shown in FIG. 1 or FIG. 2), or they may be stored in different storage mediums. In another example, the startup parameters may be set manually by the user or via input instructions, or the user may utilize software tools to set the startup parameters, and this should not be a limitation in the example of the present disclosure.

Figure 3:
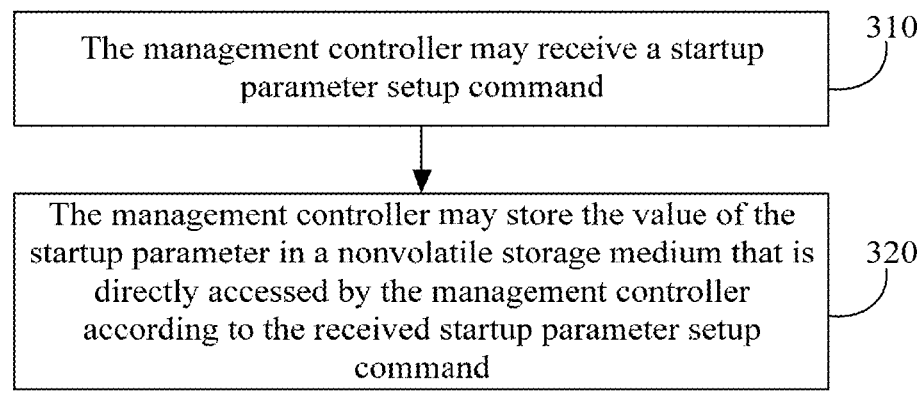
FIG. 3 is a flow chart illustrating the procedures of a method for setting a startup parameter according to an example of the present disclosure.

Referring to FIG. 3, which is a flow chart illustrating the procedures that the management controller executes the machine executable instructions corresponding to the startup parameter setting control logic.

At block 310, the management controller may receive a startup parameter setting command.

The management controller allows the user to set operating parameters, such as monitoring temperature and power supply, etc. In this example of the present disclosure, the ways for setting the operating parameters that are provided to the user by the management controller can also be used for setting the startup parameters. For example, three ways are listed in the following.

(1) The user may log in to the management controller through a serial port, and may use predetermined commands to set the value of the startup parameter in a command-line mode. Through this way, the management controller may receive the startup parameter setting command issued by the user using command lines, wherein the setting command indicates the value of the startup parameter to be set.

(2) The user may log in to the management controller through a serial port, and the management controller may display a startup parameter management interface to the user in a text mode. Under this condition, the user may set the startup parameter based on the startup parameter management interface, and the management controller receives the value of the startup parameter set by the user.

(3) For a management controller with a network function, a startup parameter setup interface may be displayed on a remote host. Under this condition, the user may complete setting of the startup parameter through the startup parameter setup interface, and the remote host transmits the user's setting to the management controller. The management controller receives the value of the startup parameter set based on the startup parameter setup interface from the remote host. The remote host usually displays the startup parameter setup interface on a web page. By setting the startup parameter through a network (for example, an operating system of the remote host can be used for providing the startup parameter setup interface), a more friendly, intuitive and attractive interface can be provided to the user.

At block 320, the management controller may store the set value of the startup parameter in a nonvolatile storage medium that is directly accessed by the management controller according to the received startup parameter setting command.

The management controller may store the value of the startup parameter designated by the received startup parameter setting command in a nonvolatile storage medium that is directly accessed by the management controller.

Under the condition that the startup parameter setting command is issued based on the command-line mode, the management controller may store the value of the startup parameter designated by the startup parameter setting command in the nonvolatile storage medium that is directly accessed by the management controller while executing each startup parameter setting command. Under the condition that the startup parameter is set based on the startup parameter management interface, after receiving the confirm operation of "saving modifications", the value of the startup parameter modified by the user is stored. Under the condition that the startup parameter is remotely set through a network, according to the generation mechanism of the startup parameter setting interface, the remote host may transmit the modified value of the startup parameter to the management controller when the user is saving modifications, or the remote host may transmit the modified value of the startup parameter to the management controller when the user is logging out the startup parameter setup interface; and then the management controller may store the modified value of the startup parameter after receiving it.

Since the value of the startup parameter is stored in the nonvolatile storage medium that is directly accessed by the management controller, the CPU may acquire the value of the startup parameter from the management controller during the startup process of the mainboard. For example, the CPU may transmit an acquiring request for acquiring the value of the startup parameter to the management controller; and the management controller may read the stored value of the startup parameter and send it to the CPU in response to the request. Thus, the mainboard may adopt the value of the startup parameter set by the user to boot.

By using the management controller to set the startup parameter, the mechanism for setting the startup parameter through the setup interface may no longer be reserved. Hence, the code for implementing the setup interface may be canceled, and the section for waiting for the user pressing a key to enter the setup interface may also be canceled during the startup process of the mainboard, which will not only reduce resource consumption of BIOS developments, but also accelerate the startup process of the mainboard.

Certainly, the above technical solution may also be compatible with existing implementations. For example, the mechanism for setting the startup parameter through the setup interface may be reserved. Under this condition, the CPU may generate a startup parameter modification command according to the modification of the startup parameter made by the user through the setup interface and transmit the startup parameter modification command to the management controller, wherein the startup parameter modification command includes the modified value of the startup parameter. After the management controller receives the startup parameter modification command from the CPU, with respect to the startup parameter involved in the startup parameter modification command, the management controller may change the stored value of the startup parameter to the value designed by the startup parameter modification command.

While the CPU is booting the mainboard according to the value of the startup parameter, a case that the mainboard's hardware does not match the value of the startup parameter, for example, the hardware does not support the value of the startup parameter may occur. At this time, the CPU will perform a hardware self-test. When determining that a startup parameter is not matched with the mainboard's hardware during the hardware self-test, in order to prevent the same case to occur during the next startup of the mainboard, the CPU may modify the value of the startup parameter to the value matched with the hardware and generate a startup parameter modification command, wherein the startup parameter modification command includes the modified value of the startup parameter. After that, the CPU may transmit the startup parameter modification command to the management controller. After the management controller receives the startup parameter modification command from the CPU, the management controller may modify the stored value of the startup parameter according to the startup parameter modification command, which may accelerate the booting speed of the mainboard thereafter.

Figure 4:
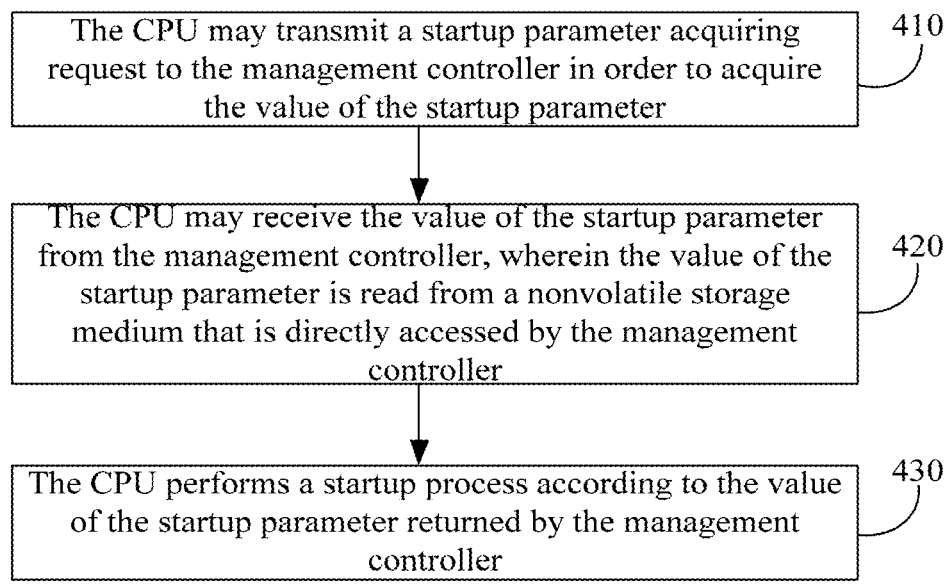
FIG. 4 is a flow chart illustrating the procedures of a method for controlling startup of a mainboard according to an example of the present disclosure.

Referring to FIG. 4, which is a flow chart illustrating the procedures that the CPU of the mainboard executes the machine executable instructions corresponding to the startup control logic.

At block 410, the CPU may transmit a startup parameter acquiring request to the management controller in order to acquire the value of the startup parameter. During the startup process of the mainboard, the CPU may transmit the startup parameter acquiring request to the management controller when the CPU intends to read the stored value of the startup parameter.

At block 420, the CPU may receive the value of the startup parameter from the management controller, wherein the value of the startup parameter is read from a nonvolatile storage medium that is directly accessed by the management controller.

After the management controller receives the startup parameter acquiring request from the CPU, the management controller reads the stored value of the startup parameter from the nonvolatile storage medium that is directly accessed by the management controller, and then transmits it to the CPU.

At block 430, the CPU may perform a startup process of the mainboard according to the value of the startup parameter returned by the management controller. For example, the CPU adopts the value of the startup parameter returned by the management controller to continue to perform the startup process.

Under the condition that the mechanism for setting the startup parameter through the setup interface is reserved, when the user sends out a command for entering the setup interface (for example, the user presses a predetermined key) in a preset time period during the startup process of the mainboard, the CPU will execute the display code for the setup interface of the BIOS in order to display the setup interface, and then the CPU will receive the modification for the value of the startup parameter made by the user based on the setup interface. Based on the user's modification, the CPU will generate a startup parameter modification command and transmit it to the management controller, wherein the startup parameter modification command includes the modified value of the startup parameter. The management controller modifies the stored value of the startup parameter according to the startup parameter modification command.

Under the condition that the value of the startup parameter does not match the hardware, the CPU will modify the value of the startup parameter to a value matched with the hardware after performing the hardware self-test, and will accordingly generate a startup parameter modification command and transmit it to the management controller, wherein the startup parameter modification command includes the modified value of the startup parameter. When receiving the startup parameter modification command, the management controller may change the stored value of the startup parameter to the modified value of the startup parameter modification command.

Since the value of the startup parameter is stored in the nonvolatile storage medium that is directly accessed by the management controller, the startup parameter may be set through the management controller any time, without considering the operating status of the mainboard. The modified startup parameter may take effect as long as the mainboard reboots once, and no need to wait for completion of the user's setting operation for the startup parameter during the startup process of the mainboard, which may effectively reduce the time for modifying the startup parameter. As a result, the maintenance time of the mainboard is reduced and the online time is increased, thereby improving the mainboard's efficiency and the equipment's availability. The value of the startup parameter is stored in a storage medium that is directly accessed by the management controller, and the BIOS program is stored in another storage medium that is directly accessed by the CPU. That is to say, the storage areas of the value of the startup parameter and the BIOS program are separated, so that the value of the startup parameter won't be affected when upgrading the BIOS, which ensures that the user's original setting is still valid after the BIOS is upgraded.

Figure 5:
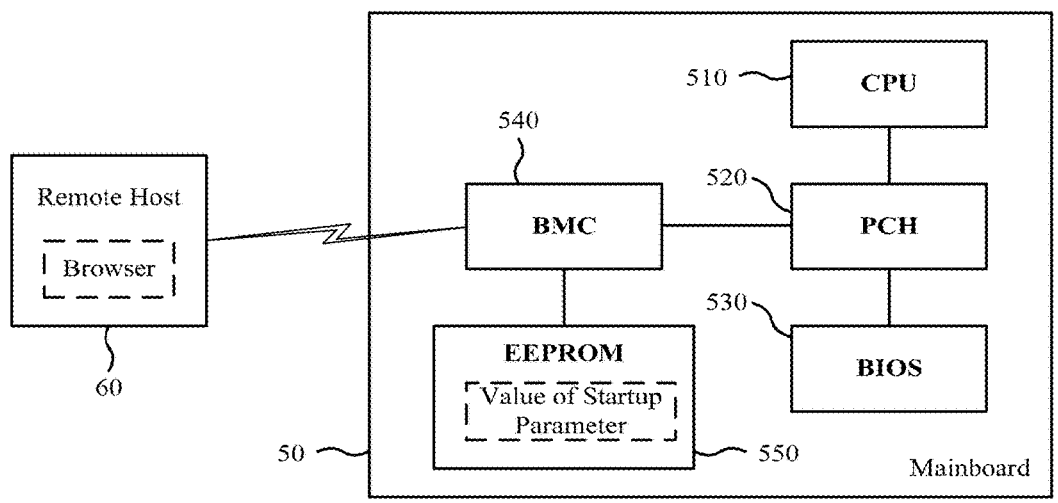
FIG. 5 is a schematic diagram showing a structure of a mainboard and a connection between the mainboard and a remote host according to an example of the present disclosure.

Referring to FIG. 5, which is another example of the present disclosure. For example, a nonvolatile storage medium 550 (such as, an EEPROM, Electrically Erasable Programmable Read-Only Memory) may be mounted under a management controller 540 (such as, a BMC), and the BMC 540 may control the accessing process of the EEPROM 550 through Serial Peripheral Interface (SPI). The value of the startup parameter may be stored in the EEPROM 550 according to the required data format of the BIOS. The PCH 520 may access the BIOS module 530 through the SPI interface or the LPC (Low Pin Count) interface. The BMC 540 may be connected to the PCH 520 through the SPI interface, the LPC interface, or the SM Bus (System Management Bus).

When the mainboard is booting, the CPU 510 may read the BIOS program in the BIOS module 530 and operate it through the PCH 520. If the value of the startup parameter is needed when operating the BIOS program, the CPU 510 may transmit a startup parameter acquiring request to the BMC 540. The BMC 540 may read the value of the start parameter in the EEPROM 550 and send it to the CPU 510 in response to the startup parameter acquiring request, such that the CPU 510 may continue to perform the BIOS program according to the value of the startup parameter. However, if the value of the startup parameter is modified during the startup process, the CPU 510 may transmit a startup parameter modification command containing the modified value of the startup parameter to the BMC 540, and the BMC 540 may modify the value of the startup parameter stored in the EEPROM 550 according to the startup parameter modification command.

The remote host 60 may access the BMC 540 through a network. The browser running on the remote host 60 may acquire the value of the startup parameter from the BMC 540, and may display a startup parameter setting interface on a web page to the user. The user may complete setting of the startup parameter based on the web page displayed on the remote host 60, and the remote host 60 may transmit the user's setting result to the BMC 540. Based on the setting result, the BMC 540 may modify the value stored in the EEPROM 550 with respect to the startup parameter modified by the user. When the mainboard is booted next time, the user's modified value of the startup parameter will be adopted, and then the user's modification may take effect. The interaction between the remote host 60 and the BMC 540 won't be affected by the operating state of the mainboard. No matter the mainboard is running in the operating system, performing the startup self-test, or even in an off state or a standby state, the startup parameter may be set.

Http (Hyper Text Transfer Protocol) or https (Hyper Text Transfer Protocol over Secure Socket Layer) may be adopted for communicating the remote host 60 and the BMC 540.

A device for setting a startup parameter, applied on a management controller of a mainboard, and a device for controlling startup of a mainboard are provided in the present disclosure. These two devices may be implemented by software, or be implemented by a combination of hardware and software. For example, the devices are implemented by software, the device for setting the startup parameter may be formed by the machine executable instructions corresponding to the startup parameter setting control logic being read out and executed by the management controller shown in FIG. 1 or FIG. 2, and the device for controlling startup of the mainboard may be formed by the machine executable instructions corresponding to the mainboard startup control logic being read out to the memory and executed by the CPU shown in FIG. 1 or FIG. 2.

Figure 6:
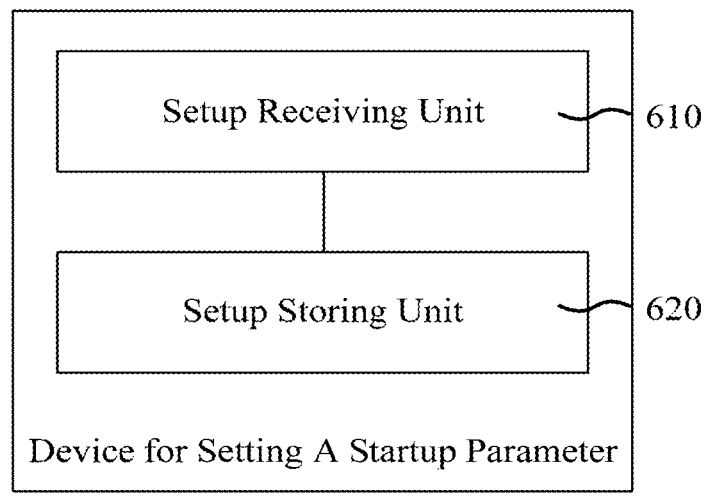
FIG. 6 illustrates a logical structure of a device for setting a startup parameter according to an example of the present disclosure.

FIG. 6 illustrates a logical structure of a device for setting a startup parameter according to an example of the present disclosure. The device is applied to the management controller of a mainboard, and may include a setup receiving unit 610 and a setup storing unit 620. The setup receiving unit 610 is used for receiving a startup parameter setting command, wherein the startup parameter setting command includes a value of a startup parameter to be set. The setup storing unit 620 is used for storing the value of the startup parameter to be set in a nonvolatile storage medium that is directly accessed by the management controller according to the startup parameter setup command.

In an example, the setup receiving unit 610 may include a remote display module and a remote receiving module. The remote display module is used for displaying a startup parameter setup interface in the form of web page on a remote host through a network. The remote receiving module is used for receiving the value of the startup parameter set based on the startup parameter setup interface from the remote host through a network.

In another example, the device for setting the startup parameter may further include a CPU modification command receiving unit and a CPU modification command performing unit. The CPU modification command receiving unit is used for receiving a startup parameter modification command from a CPU of the mainboard, wherein the startup parameter modification command includes a modified value of a startup parameter. The CPU modification command performing unit is used for modifying the stored value of the startup parameter according to the startup parameter modification command.

In another example, the device for setting the startup parameter may further include a parameter providing unit. The parameter providing unit is used for reading the stored value of the startup parameter from the nonvolatile storage medium that is directly accessed by the management controller when the startup parameter acquiring request is received from the CPU of the mainboard, and for sending the value of the startup parameter to the CPU.

Figure 7:
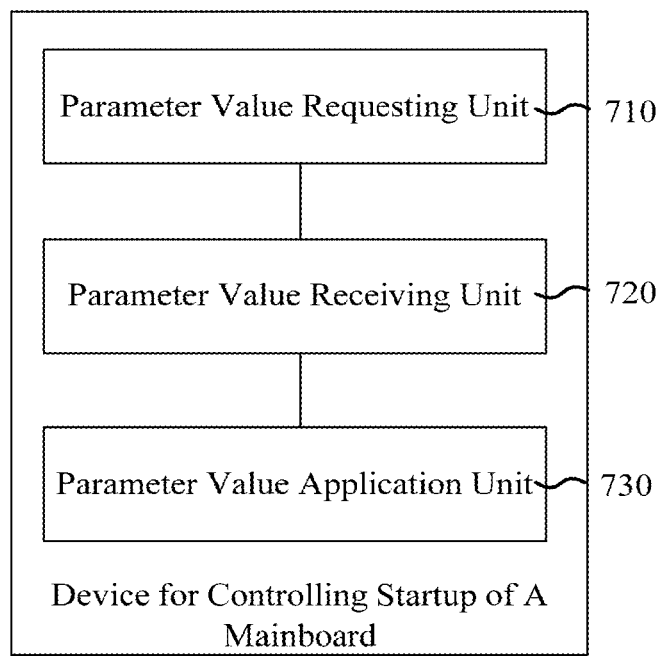
FIG. 7 illustrates a logical structure of a device for controlling startup of a mainboard according to an example of the present disclosure.

FIG. 7 illustrates a logical structure of a device for controlling startup of a mainboard according to an example of the present disclosure. The device may include a parameter value requesting unit 710, a parameter value receiving unit 720, and a parameter value application unit 730. The parameter value requesting unit 710 is used for transmitting a startup parameter acquiring request to a management controller of the mainboard in order to acquire a value of a startup parameter. The parameter value receiving unit 720 is used for receiving the value of the startup parameter from the management controller, wherein the value of the startup parameter is read from a nonvolatile storage medium that is directly accessed by the management controller. The parameter value application unit 730 is used for performing a startup process of the mainboard according to the received value of the startup parameter.

In an example, the device for controlling startup of the mainboard may further include a setup displaying unit, a setup receiving unit, and a modification command transmitting unit. The setup displaying unit is used for displaying a setup interface according to an instruction of a user. The setup receiving unit is used for receiving a modification for the value of the startup parameter, wherein the modification is made by the user based on the setup interface. The modification command transmitting unit is used for transmitting a startup parameter modification command to the management controller, wherein the startup parameter modification command includes a modified value of a startup parameter.

In another example, the device for controlling startup of the mainboard may further include a parameter value modifying unit and a modification command transmitting unit. The parameter value modifying unit is used for modifying a value of a startup parameter to a value that matches a hardware of the mainboard when determining that the value of the startup parameter does not match the hardware of the mainboard in self-test. The modification command transmitting unit is used for transmitting a startup parameter modification command to the management controller, wherein the startup parameter modification command includes a modified value of a startup parameter.

Figure 8:
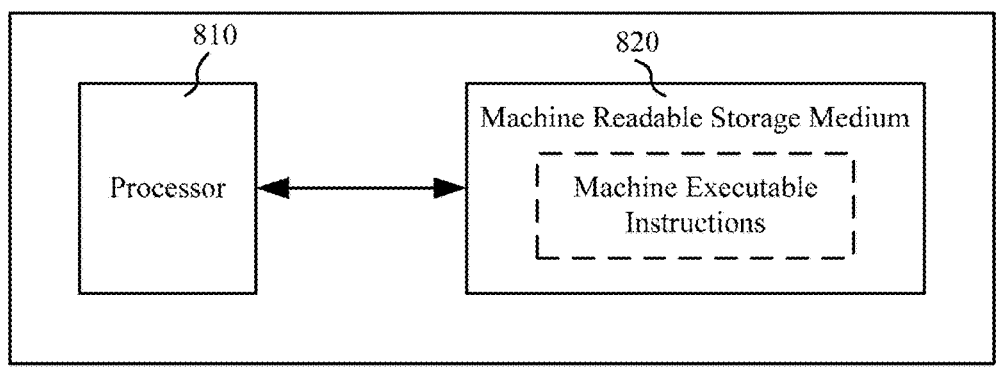
FIG. 8 illustrates a diagram of a device for setting a startup parameter according to an example of the present disclosure.

FIG. 8 illustrates a hardware architecture diagram of a device for setting a startup parameter according to an example of the present disclosure. The device may include a machine readable storage medium 820 and processor 810. The machine readable storage medium may store the machine executable instructions corresponding to the startup parameter setting control logic, which are executable by the processor.

Figure 9:
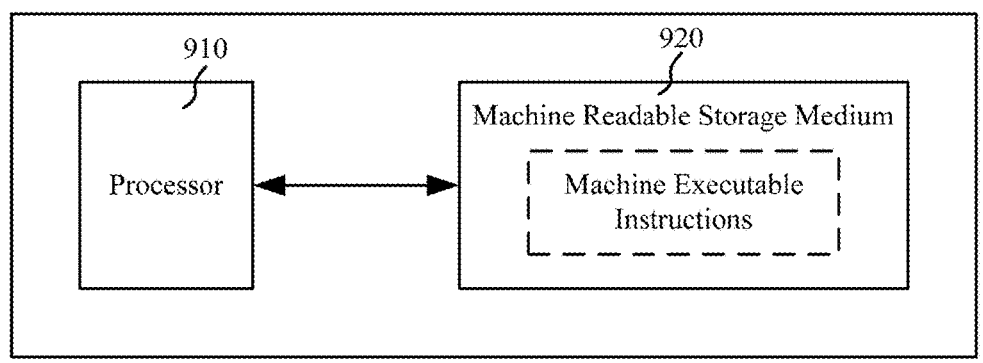
FIG. 9 illustrates a diagram of a device for controlling startup of a mainboard according to an example of the present disclosure.

FIG. 9 illustrates a hardware architecture diagram of a device for controlling startup of a mainboard according to an example of the present disclosure. The device may include a machine readable storage medium 920 and processor 910. The machine readable storage medium may store the machine executable instructions corresponding to the mainboard startup control logic, which are executable by the processor.

The machine readable storage medium may be any electronic, magnetic, optical, or other physical storage device that can contain or store information, such as executable instructions, data, and so on. In different examples, the machine readable storage medium 620 may be Random Access Memory (RAM), volatile memory, non-volatile memory, flash memory, storage drives (such as, hard drive), solid state drive, any type of storage disks (such as, CD-ROM, DVD, etc.), or similar storage medium, or a combination thereof. In another example, any one of the machine readable storage medium may be non-transitory.

The foregoing examples are merely illustrative of the disclosure but are not intended to limit the disclosure, and any modifications, equivalent substitutions, adaptations, thereof made without departing from the spirit and scope of the disclosure shall be encompassed in the claimed scope of the appended claims.

The invention claimed is:

1. A method for setting a startup parameter, comprising:
receiving, by a management controller of a mainboard, a startup parameter setting command, wherein the startup parameter setting command comprises a value of a startup parameter to be set;
storing, by the management controller, the value of the startup parameter to be set in a non-transitory storage medium that is directly accessed by the management controller according to the startup parameter setting command;
receiving, by the management controller, a startup parameter modification command from a Central Processing Unit (CPU) of the mainboard, wherein the startup parameter modification command comprises a modified value of the startup parameter; and
modifying, by the management controller, the value of the startup parameter stored in the non-transitory storage medium that is directly accessed by the management controller according to the startup parameter modification command, wherein the startup parameter is modified by the management controller simultaneously when the mainboard is running.

2. The method according to claim 1, wherein receiving the startup parameter setting command comprises:
receiving, by the management controller, the startup parameter setting command from a remote host through a network, wherein the remote host displays a startup parameter setup interface on a web page, and the startup parameter setting command is generated in response to a user's operation on the startup parameter setup interface; or
receiving, by the management controller, the startup parameter setting command through a serial port, wherein the startup parameter setting command is generated in response to a user's operation on a startup parameter management interface of a text mode, or is issued by a user based on a command-line mode.

3. A method for controlling startup of a mainboard, comprising:
transmitting, by a Central Processing Unit (CPU) of the mainboard during a startup process of the mainboard, a startup parameter acquiring request to a management controller of the mainboard in order to acquire a value of a startup parameter, wherein the management controller is coupled to the CPU via a Northbridge and a Southbridge, wherein the management controller operates independently of the CPU, and wherein the management controller is configured to directly access a non-transitory storage medium;
receiving, by the CPU during the startup process of the mainboard, the value of the startup parameter from the management controller, wherein the value of the startup parameter is read from the non-transitory storage medium;
performing, by the CPU, the startup process of the mainboard according to the received value of the startup parameter; and
transmitting, by the CPU, a startup parameter modification command to the management controller, wherein the startup parameter modification command comprises a modified value of the startup parameter, wherein the startup parameter modification command causes the management controller to modify, simultaneously when the mainboard is running, the value of the startup parameter stored in the non-transitory storage medium.

4. The method according to claim 3, further comprising:
displaying, by the CPU, a setup interface according to an instruction of a user;
receiving, by the CPU during the startup process of the mainboard, a modification for the value of the startup parameter, wherein the modification is made by the user through the setup interface; and
transmitting, by the CPU, a startup parameter modification command to the management controller, wherein the startup parameter modification command comprises a modified value of a startup parameter.

5. The method according to claim 3, further comprising:
when determining that a value of a startup parameter does not match a hardware of the mainboard in self-test, modifying, by the CPU, the value of the startup parameter to a value that matches the hardware of the mainboard; and
transmitting, by the CPU, a startup parameter modification command to the management controller, wherein the startup parameter modification command comprises a modified value of the startup parameter.

6. A device comprising a processor and a non-transitory storage medium for storing machine executable instructions, and by executing the machine executable instructions, the processor is caused to:
receive a startup parameter setting command, wherein the startup parameter setting command comprises a value of a startup parameter to be set;
store the value of the startup parameter to be set in a non-transitory storage medium that is directly accessed by a management controller of a mainboard according to the startup parameter setting command;
receive, by the management controller, a startup parameter modification command from a Central Processing Unit (CPU) of the mainboard, wherein the startup parameter modification command comprises a modified value of the startup parameter; and
modify, by the management controller, the value of the startup parameter stored in the non-transitory storage medium that is directly accessed by the management controller according to the startup parameter modification command, wherein the startup parameter is modified by the management controller simultaneously when the mainboard is running.

7. The device according to claim 6, wherein the machine executable instructions further cause the processor to:

receive the startup parameter setting command from a remote host through a network, wherein the remote host displays a startup parameter setup interface on a web page, and the startup parameter setting command is generated in response to a user's operation on the startup parameter setup interface; or receive the startup parameter setting command through a serial port, wherein the startup parameter setting command is generated in response to a user's operation on a startup parameter management interface of a text mode, or is issued by a user based on a command-line mode.

8. A device comprising a processor and a non-transitory storage medium for storing machine executable instructions, and by executing the machine executable instructions, the processor is caused to:

transmit, by a Central Processing Unit (CPU) of a mainboard during a startup process of the mainboard, a startup parameter acquiring request to a management controller of the mainboard in order to acquire a value of a startup parameter, wherein the management controller is coupled to the CPU via a Northbridge and a Southbridge, wherein the management controller operates independently of the CPU, and wherein the management controller is configured to directly access a non-transitory storage medium;

receive, by the CPU during the startup process of the mainboard, the value of the startup parameter from the management controller, wherein the value of the startup parameter is read from the non-transitory storage medium that is directly accessed by the management controller;

perform, by the CPU, the startup process of the mainboard according to the received value of the startup parameter; and transmit, by the CPU during the startup process, a startup parameter modification command to the management controller, wherein the startup parameter modification command comprises a modified value of the startup parameter, wherein the startup parameter modification command causes the management controller to modify, simultaneously when the mainboard is running, the value of the startup parameter stored in the non-transitory storage medium.

9. The device according to claim 8, wherein the machine executable instructions further cause the processor to:

display a setup interface according to an instruction of a user;

receive, by the CPU during the startup process of the mainboard, a modification for the value of the startup parameter, wherein the modification is made by the user through the setup interface; and transmit a startup parameter modification command to the management controller, wherein the startup parameter modification command comprises a modified value of a startup parameter.

10. The device according to claim 8, wherein the machine executable instructions further cause the processor to:

modify a value of a startup parameter to a value that matches a hardware of the mainboard when determining that the value of the startup parameter does not match the hardware of the mainboard in self-test; and transmit a startup parameter modification command to the management controller, wherein the startup parameter modification command comprises a modified value of the startup parameter.

* * * * *